US012747563B2

(12) United States Patent
Wuisan et al.

(10) Patent No.: US 12,747,563 B2
(45) Date of Patent: Sep. 29, 2026

(54) SYSTEM AND METHOD FOR VISUALLY REPRESENTING SUBTERRANEAN OBJECTS OF INTEREST IN A FIELD OF VIEW DISPLAY FOR A WORK AREA

(71) Applicant: Deere & Company, Moline, IL (US)

(72) Inventors: Giovanni A Wuisan, Epworth, IA (US); Kurt A. Chipperfield, Dubuque, IA (US); Taylor Xia, Dubuque, IA (US)

(73) Assignee: Deere & Company, Moline, IL (US)

( * ) Notice: Subject to any disclaimer, the term of this patent is extended or adjusted under 35 U.S.C. 154(b) by 94 days.

(21) Appl. No.: 18/915,425

(22) Filed: Oct. 15, 2024

(65) Prior Publication Data

US 2026/0103875 A1 Apr. 16, 2026

(51) Int. Cl.
*E02F 9/26* (2006.01)
*G06V 10/80* (2022.01)
*G06V 20/56* (2022.01)

(52) U.S. Cl.
CPC .............. *E02F 9/262* (2013.01); *E02F 9/265* (2013.01); *G06V 10/803* (2022.01); *G06V 20/56* (2022.01)

(58) Field of Classification Search
CPC ........ E02F 9/262; E02F 9/265; G06V 10/803; G06V 20/56
See application file for complete search history.

(56) References Cited

U.S. PATENT DOCUMENTS 4,945,221 A 7/1990 Nielsen et al.
5,147,172 A 9/1992 Hosseini
5,493,798 A 2/1996 Rocke et al.
5,520,499 A 5/1996 Ufheil et al.
6,247,538 B1 6/2001 Takeda et al.
6,477,914 B1 11/2002 Krieger
6,736,216 B2 5/2004 Savard et al.
(Continued)

FOREIGN PATENT DOCUMENTS

| | | | | |
|---|---|---|---|---|
| EP | 3744160 B1 * | 2/2024 | ........... | G05D 1/0044 |
| GB | 2558258 A * | 7/2018 | ............. | G01C 15/00 |

(Continued)

*Primary Examiner* — Mary Cheung

(74) *Attorney, Agent, or Firm* — Gary L. Montle; Lucian Wayne Beavers; Patterson Intellectual Property Law, PC

(57) ABSTRACT

A data processing system and method are provided for preventing avoidable engagement with subterranean objects during operations by work machines comprising ground-engaging work implements. Electronically mapped position data are determined for subterranean objects of interest (SOI) in an area to be worked, comprising at least latitudinal and longitudinal dimensions for each SOI. The position data may be detected and mapped using subterranean monitoring sensors mounted on work implements. Image data are captured corresponding to a field of view directed from a point associated with the work machine. Respective positions are determined for any SOI within the field of view, relative to the point. A display is automatically rendered corresponding to the image data, further visually populated to include virtual tokens for each SOI within the field of view and corresponding to the respective position data. The display may comprise augmented reality or mixed reality content rendered on a wearable unit.

20 Claims, 6 Drawing Sheets

(56) References Cited

U.S. PATENT DOCUMENTS

| | | | |
|---|---|---|---|
| 6,766,236 | B1 | 7/2004 | Lamela et al. |
| 7,477,973 | B2 | 1/2009 | Brewer et al. |
| 7,934,329 | B2 | 5/2011 | Mintah et al. |
| 8,141,650 | B2 | 3/2012 | Breiner et al. |
| 8,180,532 | B2 | 5/2012 | James et al. |
| 8,634,991 | B2 | 1/2014 | Douglas |
| 8,689,471 | B2 | 4/2014 | Carpenter et al. |
| 8,817,238 | B2 | 8/2014 | Montgomery |
| 8,919,455 | B2 | 12/2014 | Hendron et al. |
| 9,074,546 | B2 | 7/2015 | Asami et al. |
| 9,187,879 | B2 | 11/2015 | Suk |
| 9,234,329 | B2 | 1/2016 | Jaliwala et al. |
| 9,328,479 | B1 | 5/2016 | Rausch et al. |
| 9,428,885 | B2 | 8/2016 | Nau |
| 9,551,115 | B2 | 1/2017 | Engels et al. |
| 9,551,130 | B2 | 1/2017 | Hendron et al. |
| 9,581,691 | B2 | 2/2017 | Simicevic et al. |
| 9,624,643 | B2 | 4/2017 | Hendron et al. |
| 9,638,525 | B1 | 5/2017 | Willis |
| 9,976,285 | B2 | 5/2018 | Padilla |
| 9,995,016 | B1 | 6/2018 | Howell et al. |
| 10,094,654 | B2 | 10/2018 | Crozier et al. |
| 10,246,854 | B2 | 4/2019 | Greer |
| 10,401,176 | B2 | 9/2019 | Nackers et al. |
| 10,532,741 | B2 | 1/2020 | Kean et al. |
| 10,704,233 | B2 | 7/2020 | Dusha |
| 10,883,248 | B2 | 1/2021 | Stotlar |
| 11,085,170 | B2 | 8/2021 | Roulston et al. |
| 11,414,839 | B2 | 8/2022 | Shintani et al. |
| 2005/0275184 | A1 | 12/2005 | Lamela et al. |
| 2008/0047170 | A1 | 2/2008 | Nichols |
| 2011/0311342 | A1 | 12/2011 | Montgomery |
| 2013/0080112 | A1 | 3/2013 | Friend |
| 2013/0103247 | A1 | 4/2013 | Ogawa et al. |
| 2014/0158452 | A1 | 6/2014 | Bowman et al. |
| 2014/0168009 | A1 | 6/2014 | Peake |
| 2014/0343800 | A1 | 11/2014 | Nelson et al. |
| 2016/0003171 | A1 | 1/2016 | Ge |
| 2016/0258128 | A1 | 9/2016 | Nakamura et al. |
| 2019/0100205 | A1 | 4/2019 | Kean et al. |
| 2019/0234045 | A1 | 8/2019 | Wiewel et al. |
| 2020/0032489 | A1* | 1/2020 | Yamazaki ............... E02F 9/262 |
| 2020/0042023 | A1 | 2/2020 | Garvin et al. |
| 2020/0349760 | A1 | 11/2020 | Hendron |
| 2021/0027489 | A1* | 1/2021 | Shimamura ............ G06V 20/56 |
| 2021/0131073 | A1* | 5/2021 | Wisley .................... E02F 9/262 |
| 2021/0189667 | A1 | 6/2021 | Fritz |
| 2022/0012868 | A1* | 1/2022 | Habe ..................... G06T 7/0004 |
| 2022/0398512 | A1* | 12/2022 | Sawada ................... E02F 9/205 |
| 2025/0369772 | A1* | 12/2025 | Braunstein ......... G01C 21/3826 |
| 2025/0370456 | A1* | 12/2025 | Whitten ................. G05D 1/244 |
| 2026/0044149 | A1* | 2/2026 | Tokieda ............. G01C 21/3826 |

FOREIGN PATENT DOCUMENTS

| | | | |
|---|---|---|---|
| WO | 2008129345 | A1 | 10/2008 |
| WO | 2012157381 | A1 | 11/2012 |

* cited by examiner

SYSTEM AND METHOD FOR VISUALLY REPRESENTING SUBTERRANEAN OBJECTS OF INTEREST IN A FIELD OF VIEW DISPLAY FOR A WORK AREA

FIELD OF THE DISCLOSURE

The present disclosure relates generally to the surveying and mapping of subterranean elements such as utility locations, and more particularly to systems and methods for facilitating visual awareness of subterranean elements in a field of view display in an area to be worked by for example work machines such as excavators.

BACKGROUND

Work operations in worksites (also referenced herein as work areas, or areas to be worked during such work operations) may frequently involve ground disturbing operations in which the ground adjacent or under the machines is excavated, scraped, or otherwise disturbed. A number of different problems can arise in performing these types of operations. For instance, there may be items underground which will be destroyed by the ground disturbing operation. By way of example, there may be underground utilities (such as electrical wires, fiber optic cables, gas lines, water/sewer lines, etc.) buried under the ground to be disturbed. When the ground disturbing operation is performed (such as an excavation) the excavation may damage or destroy these items. Repairs can be time consuming and expensive. Similarly, where the item that is damaged is hazardous (such as a gas line), damaging the item may be dangerous for operators and equipment in the vicinity of the operation.

Various examples of systems and methods for worksite analysis using subterranean monitoring technology, including but not limited to ground penetrating radar (GPR), electromagnetic location (EML), and equivalent systems and techniques thereto, are conventionally known. For example, some work machines such as excavators and backhoes are also known to have work implements such as buckets which are equipped with antenna units that can detect certain subterranean objects when in contact with the ground.

Various examples of systems and methods also exist for visually representing work plans with respect to a worksite, typically overhead views. However, the maps often do not match the reality of current worksite conditions, especially with regards to the actual placement of utilities, and conventional user interfaces do not enable three-dimensional representations of the worksite and subterranean objects in an intuitive manner, and perhaps more importantly, accurately. This is particularly true for worksites lacking build plans with prominent features such as walls with respect to which mapped subterranean objects may be easily defined or oriented for subsequent work.

BRIEF SUMMARY

The current disclosure provides enhancements to conventional systems for real-time representation, preferably from the perspective (field of view) and orientation of an operator, of subterranean objects of interest in the context of an area to be worked by work machines such as excavation equipment (like an excavator or backhoe loader) on site.

In one particular and exemplary embodiment, a method is disclosed herein for visually representing subterranean objects of interest during operations by a work machine comprising a work implement having a ground engaging tool on a first end thereof, wherein the work implement is coupled at a second end to a frame of the work machine and configured to move independently of the frame. The method comprises: determining electronically mapped position data of one or more subterranean objects of interest in an area to be worked, wherein the mapped position data comprise at least latitudinal and longitudinal dimensions for each respective subterranean object of interest in a global coordinate system; capturing image data corresponding to a field of view directed from a point associated with the work machine; determining respective positions for any of the one or more subterranean objects of interest within the field of view, relative to the point associated with the work machine; and automatically rendering a display corresponding to the captured image data, further visually populated to include virtual tokens for each of the any subterranean objects of interest within the field of view and corresponding to the respective position data thereof.

In one exemplary aspect according to the above-referenced method embodiment, the step of determining respective positions for any of the one or more subterranean objects of interest within the field of view, relative to the point associated with the work machine, may comprise fusing the mapped position data and position data corresponding to an image data source pose into a common reference coordinate system.

In another exemplary aspect according to the above-referenced method embodiment, the image data source may be a camera mounted on the work machine, and moveable in orientation to define the image data source pose and the field of view.

In another exemplary aspect according to the above-referenced method embodiment, the image data source may be a camera mounted on a wearable unit, the wearable unit comprising the display and an inertial sensor unit configured to generate output signals representing the image data source pose based on movements of a wearer thereof.

In another exemplary aspect according to the above-referenced method embodiment, the virtual tokens may be visually rendered to correspond with ground surface locations within the field of view having the latitudinal and longitudinal dimensions for each respective subterranean object of interest, and each virtual token may be further associated with visually rendered indicia representing a mapped depth of the respective subterranean object of interest.

In another exemplary aspect according to the above-referenced method embodiment, movement of the ground engaging tool may be automatically controlled with respect to a target grade profile, further accounting for and avoiding engagement with the one or more subterranean objects of interest in the area to be worked.

In another exemplary aspect according to the above-referenced method embodiment, the automatically rendered display may be further visually populated to include a virtual path for the ground engaging tool, preferably accounting for and avoiding engagement with the one or more subterranean objects of interest in the area to be worked.

In another exemplary aspect according to the above-referenced method embodiment, at least one of the one or more subterranean objects of interest may be detected via output signals from a subterranean monitoring sensor associated with the work implement, wherein one or more parameters associated with the at least one of the one or more subterranean objects are automatically mapped to respective locations in an electronic worksite map.

In another exemplary aspect according to the above-referenced method embodiment, the electronic worksite map may comprise previously mapped position data for the at least one of the one or more subterranean objects of interest, wherein a work plan for the work machine generated based on the previously mapped position data may be verified by comparison with the detected at least one of the one or more subterranean objects of interest.

In another exemplary aspect according to the above-referenced method embodiment, the electronic worksite map may comprise previously mapped position data within a portion of the area to be worked, wherein a prompt may be generated to traverse a remaining portion of the area to be worked and to detect and map any further subterranean objects of interest.

In another exemplary aspect according to the above-referenced method embodiment, at least one of the one or more subterranean objects of interest may be detected via output signals from a subterranean monitoring sensor associated with a work implement of a first work machine, wherein one or more parameters associated with the at least one of the one or more subterranean objects may be automatically mapped to respective locations in an electronic worksite map, and wherein upon updating the electronic worksite map by automatically mapping the one or more parameters associated with the at least first type of detected object to respective locations therein the electronic worksite map, the updated electronic worksite map may be uploaded to a remote data storage by the first work machine, and retrievable by a second work machine performing an earth working operation in association with the area to be worked.

In another embodiment as disclosed herein, a system is provided for visually representing subterranean objects of interest during operations by a work machine comprising a work implement having a ground engaging tool on a first end thereof, wherein the work implement is coupled at a second end to a frame of the work machine and configured to move independently of the frame. Data storage comprises electronically mapped position data of one or more subterranean objects of interest in an area to be worked, wherein the mapped position data comprise at least latitudinal and longitudinal dimensions for each respective subterranean object of interest in a global coordinate system. An image data source is configured to capture image data corresponding to a field of view directed from a point associated with the work machine. One or more processors are functionally linked to the data storage and to the image data source and may be configured to direct the performance of steps according to the above-referenced method embodiment.

Numerous objects, features, and advantages of the embodiments set forth herein will be readily apparent to those skilled in the art upon reading of the following disclosure when taken in conjunction with the accompanying drawings.

DETAILED DESCRIPTION

Figure 1:
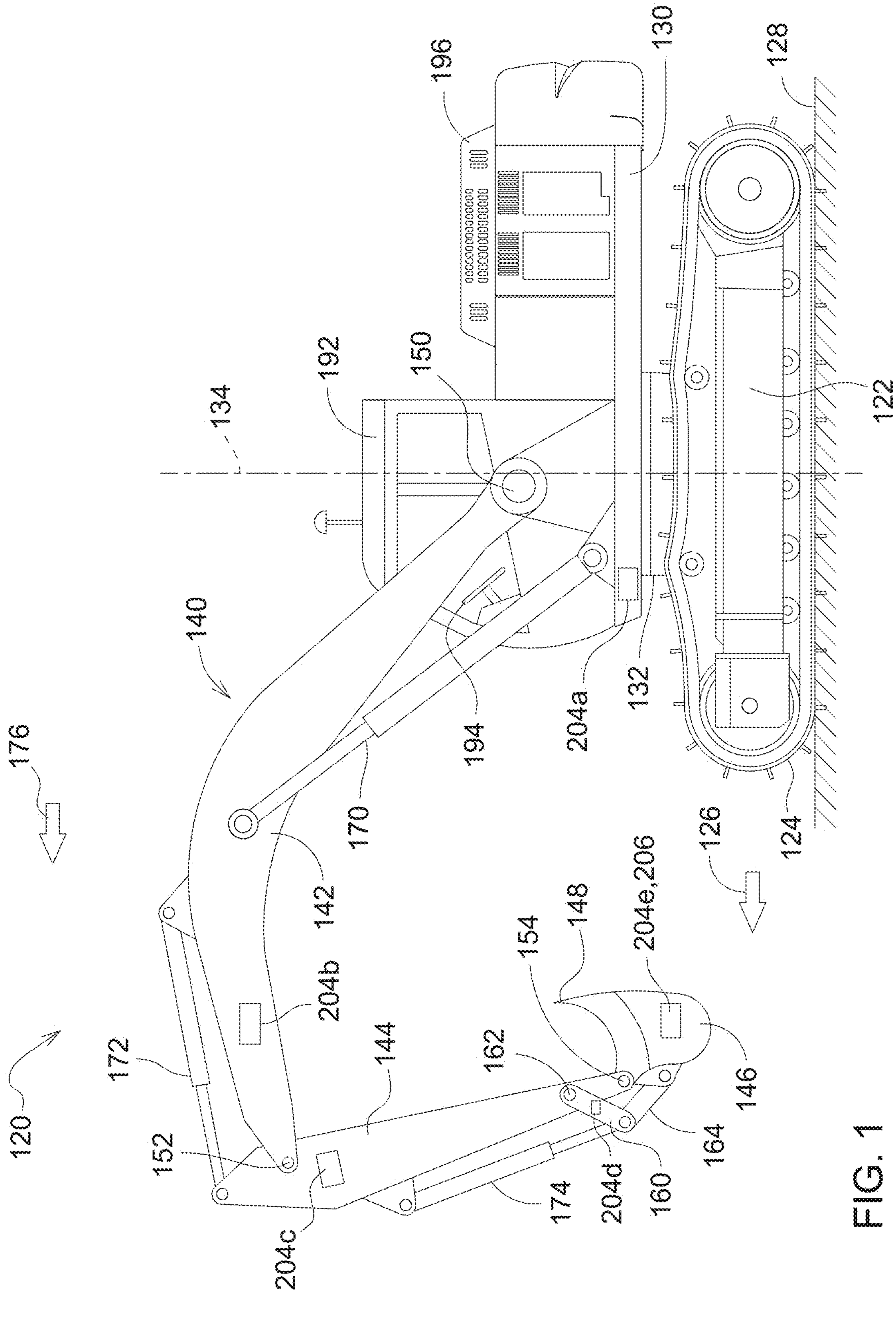
FIG. 1 is a side view representing an excavator as an exemplary work machine according to an embodiment of the present disclosure.

While the making and using of various embodiments consistent with the present disclosure are discussed in detail below, it should be appreciated that the present disclosure provides many applicable inventive concepts that can be embodied in a wide variety of specific contexts. The specific embodiments discussed herein are merely illustrative of specific ways to make and use aspects of the disclosure and do not delimit the scope of the present disclosure.

Referring generally to FIGS. 1-6, various exemplary systems, work machines, and associated methods according to the present disclosure are described in detail. Where the various figures may describe embodiments sharing various common elements and features with other embodiments, similar elements and features are given the same reference numerals and redundant description thereof may be omitted below.

Work machines configured for excavation within a worksite (like an excavator or backhoe loader) typically contain at least one work implement that can be manipulated in three-dimensional (3D) space about the machine chassis. A work machine may further be provided with a system of measurement devices that provide a known position of every rigid body of the work machine in 3D space. This kinematic system measures all rigid body motion and evaluates the pose of the machine chassis relative to earth (pitch/roll/yaw). The system also contains devices for evaluating the geospatial location of the machine, typically through the use of global navigation satellite system (GNSS) positioning with real-time kinematic (RTK) correction. The combined use of these systems allows the work machine to precisely evaluate the location of the implement relative to global coordinates. Understanding the global position of the implement allows the machine to also control the implement to a desired global location. This is the premise of existing solutions for grade management that are offered in the industry today.

In addition to the measurement system described above, a work machine according to the present disclosure may further be provided with a control system capable of manipulating all degrees of freedom for the work implement. This may include, for example, precision control devices within the hydraulic system that are electronically activated (commonly known as "electro-hydraulic actuators"). This allows the machine control system to manage machine trajectories along a control path defined within a design. This system may be advanced enough to deliver a fully autonomous solution capable of running without an operator in control of the machine.

To effectively implement the system being disclosed, the work machine may further include a system for evaluating the elevation of the terrain surrounding the machine. Common technologies that exist in the industry include stereo vision, lidar, radar, and others. These systems provide perception about the machine, allowing for a comprehensive idea of terrain elevations. This information helps to ensure that the machine does not drive the work implement (and associated equipment) into the ground during operation.

In various embodiments as disclosed herein, such a system may further include the capability of surveying for subterranean objects of interest such as for example utility locations. This capability may involve the use of utility surveying equipment located on the work implement of the machine. In utility surveying applications, several technologies exist for identifying underground utilities, including electromagnetic and ground penetrating radar devices. For an application according to the present disclosure, these devices may be integrated into the machine implement and protected from damage during normal excavating operations. Additionally, or in the alternative, the equipment could potentially be placed in a location along the implement that is generally safe from excavation operations, so long as the technology can deliver accurate feedback at some distance from the ground.

In the context of the present disclosure, a subterranean object of interest may be any subterranean object that is detected or detectable using surveying equipment, and further defined as being of interest with respect to operations by a work machine. For example, a number of types of subterranean objects may be distinguishable using surveying equipment, wherein one or more of the types of subterranean objects may be defined as objects of interest due to a desire to identify and avoid engaging with such objects. As another example, some types of subterranean objects may be designated as not being of sufficient interest, and/or some respective types of subterranean objects may be designated for different and respective types of visual representations as further described below.

FIG. 1 depicts a representative self-propelled work machine 120 in the form of, for example, a tracked excavator machine. The work machine 120 includes an undercarriage 122 including first and second ground engaging units 124 (e.g., tracks). Only one of the ground engaging units is shown in FIG. 1. The other ground engaging unit is parallel to the illustrated ground engaging unit. The undercarriage includes respective first and second travel motors (not shown) for driving the first and second ground engaging units. The ground engaging units can be driven at the same velocity to move the undercarriage forward (e.g., in a forward direction indicated by an arrow 126) or backward (e.g., in a direction opposite the arrow 126) with respect to underlying terrain 128 (e.g., ground or other material supporting the undercarriage). The ground engagement units can also be driven at different velocities to enable the undercarriage to turn with respect to the terrain at an angle with respect to the forward direction represented by the arrow 126.

A main frame 130 is supported from the undercarriage 122 by a swing bearing 132 such that the main frame is pivotable about a main frame pivot axis 134 relative to the undercarriage. The pivot axis is substantially vertical when the underlying ground terrain 128 engaged by the ground engaging units 124 is substantially horizontal. (In the discussion herein, "horizontal" and "vertical" are referenced to a plane defined by the ground engaging units.) A swing motor (not shown) is configured to pivot the main frame on the swing bearing about the pivot axis relative to the undercarriage.

In the illustrated embodiment wherein the work machine 120 is an excavator, a work implement 140 extends from the main frame 130. In FIG. 1, the work implement is configured as a boom assembly. The work implement includes conventional components in the form of a boom 142, an arm 144, and a working tool 146. The working tool includes a point-of-interest (POI) 148, which engages portions of terrain (or other materials) to be moved or removed.

The boom 142 is pivotally connected to the main frame by a boom-to-frame linkage joint 150, which provides a horizontal pivot axis for the boom. The arm is pivotally connected to the boom at an arm-to-boom linkage joint 152. In the illustrated embodiment, the working tool 146 is an excavator shovel, which is pivotally connected to the arm 144 at a working tool-to-arm linkage joint 154, which is positioned near a free end of the arm. In the illustrated embodiment, a first end of a dogbone connector 160 is pivotally connected to the arm at a dogbone-to-arm linkage joint 162, which is displaced from the free end of the arm. A second end of the dogbone connector is pivotally connected to a tool link 164. In the context of the illustrated (excavator) work machine 120, the tool link is a bucket link.

The boom 142 is caused to move pivotally with respect to the main frame 130 by a boom actuator 170. The boom actuator can be a hydraulic motor. In the illustrated embodiment, the boom actuator is a hydraulic piston-cylinder unit that is selectively provided with pressurized hydraulic fluid to move the piston within the cylinder to extend or extract the piston. The pressurized hydraulic fluid is provided by a hydraulic system (not shown) and is controlled by manual controls, automatic controls, or a combination of manual and automatic controls. In a similar manner, the arm 144 is caused to pivot with respect to the boom by an arm actuator 172. The working tool (bucket) 146 is caused to pivot with respect to the arm by a working tool actuator 174 acting on the working tool via the dogbone connector 160, the dogbone-to-arm linkage joint 162, and the tool link 164.

The work implement 140 extends from the main frame 130 along a working direction (represented by arrow 176) of the work implement. In FIG. 1, the working direction is referenced to the main frame. Although illustrated as parallel to the forward direction (arrow 126) of the undercarriage 122, the working direction can be at an angle to the forward direction depending on the rotational position of the main frame with respect to the undercarriage. The working direction can also be described as a working direction of the boom 142.

As described herein, control of the work implement 140 relates to controlling the positioning of any one or more of the associated components (e.g., the boom 142, the arm 144, and the working tool 146) to control the movement of the point-of-interest 148 of the working tool with respect to material be manipulated (e.g., the material to be moved or removed).

The actuators 170, 172, 174 of the work implement 140 can be selectively actuated to pivotally move the boom 142 with respect to the respective boom-to-frame linkage joint 150, to pivotally move the arm 144 with respect to the arm-to-boom linkage joint 152, and/or to pivotally move the working tool 146 with respect to the working tool-to-arm linkage joint 154. By coordinating the movements of the boom, the arm, and the working tool of the work implement, the point-of-interest of the working tool engages and acts upon the material to be manipulated along a selected trajectory and at a target velocity. The selected trajectory can be curved as shown (e.g., by pivoting the working tool about the working tool-to-arm linkage joint or by pivoting the arm about the arm-to-boom linkage joint). The selected trajectory can also be linear by coordinating the pivoting of the boom, the arm, and the working tool using inverse kinematic techniques or other suitable techniques (e.g., open loop modeling) to determine the respective pivotal velocities of the three components of the work implement 140.

In the illustrated embodiment, an operator's cab 192 is located on the main frame 130. In the illustrated embodiment, the operator's cab and the work implement 140 are both mounted on the main frame so that the operator's cab faces in the working direction (arrow 176) of the work implement. In the illustrated embodiment, a control station 194 is located in the operator's cab.

The main frame 130 also supports an engine 196 for powering the work machine 120. The engine can be a diesel internal combustion engine or another source of power. In the illustrated embodiment, the engine drives at least one hydraulic pump (not shown) to provide hydraulic power to the various operating systems of the work machine.

In the illustrated embodiment, a sensor system 204 (see FIG. 2) is also mounted on the work machine 120. As illustrated in FIG. 1, the sensor system includes a first sensor **204*a* mounted to the main frame 130, a second sensor 204*b* mounted to the boom 142, a third sensor 204*c* mounted to the arm 144, a fourth sensor 204*d* mounted to the dogbone connector 160, and a fifth sensor 204*e* mounted to the working tool 146**.

In the illustrated embodiment, each of the first through fifth sensors is an inertial measurement unit (IMU). IMUs are tools that capture a variety of motion-based and position-based measurements, including, but not limited to, velocity, acceleration, angular velocity, and angular acceleration. IMUs include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field.

Generally, as discussed above, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similarly to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU.

An accelerometer is an electro-mechanical device or tool used to measure acceleration (e.g., in meters per seconds squared ($m/s^2$)), which is defined as the rate of change of velocity (e.g., in meters per second (m/s)) of an object. Accelerometers sense either static forces (e.g., gravity) or dynamic forces of acceleration (e.g., vibration and movement). An accelerometer may receive sense elements measuring the force due to gravity. By measuring the quantity of static acceleration due to gravity of the Earth, an accelerometer may provide data as to the angle the object is tilted with respect to the Earth, the angle of which may be established in an x-axis, y-axis, and z-axis coordinate frame. However, where the object is accelerating in a particular direction, such that the acceleration is dynamic (as opposed to static), the accelerometer produces data which does not effectively distinguish the dynamic forces of motion from the force due to gravity by the Earth. A gyroscope is a device used to measure changes in orientation, based upon the object's angular velocity (rad/s) or angular acceleration ($rad/s^2$). A gyroscope may constitute a mechanical gyroscope, a micro-electro-mechanical system (MEMS) gyroscope, a ring laser gyroscope, a fiber-optic gyroscope, and/or other gyroscopes as are known in the art. Principally, a gyroscope is employed to measure changes in angular position of an object in motion, the angular position of which may be established in an x-axis, y-axis, and z-axis coordinate frame.

In an embodiment, for each of at least one linkage joint associated with a work implement 140 (e.g., each coupled set of components in a boom assembly), sense elements from the received work implement position sensor output signals may be fused in an independent coordinate frame associated at least in part with the respective linkage joint, the independent coordinate frame of which is independent of a global navigation frame for the work machine 120, wherein for example measurements received by work implement position sensors 204 may be merged to produce a desired output in the work implement of the work machine.

Figure 2:
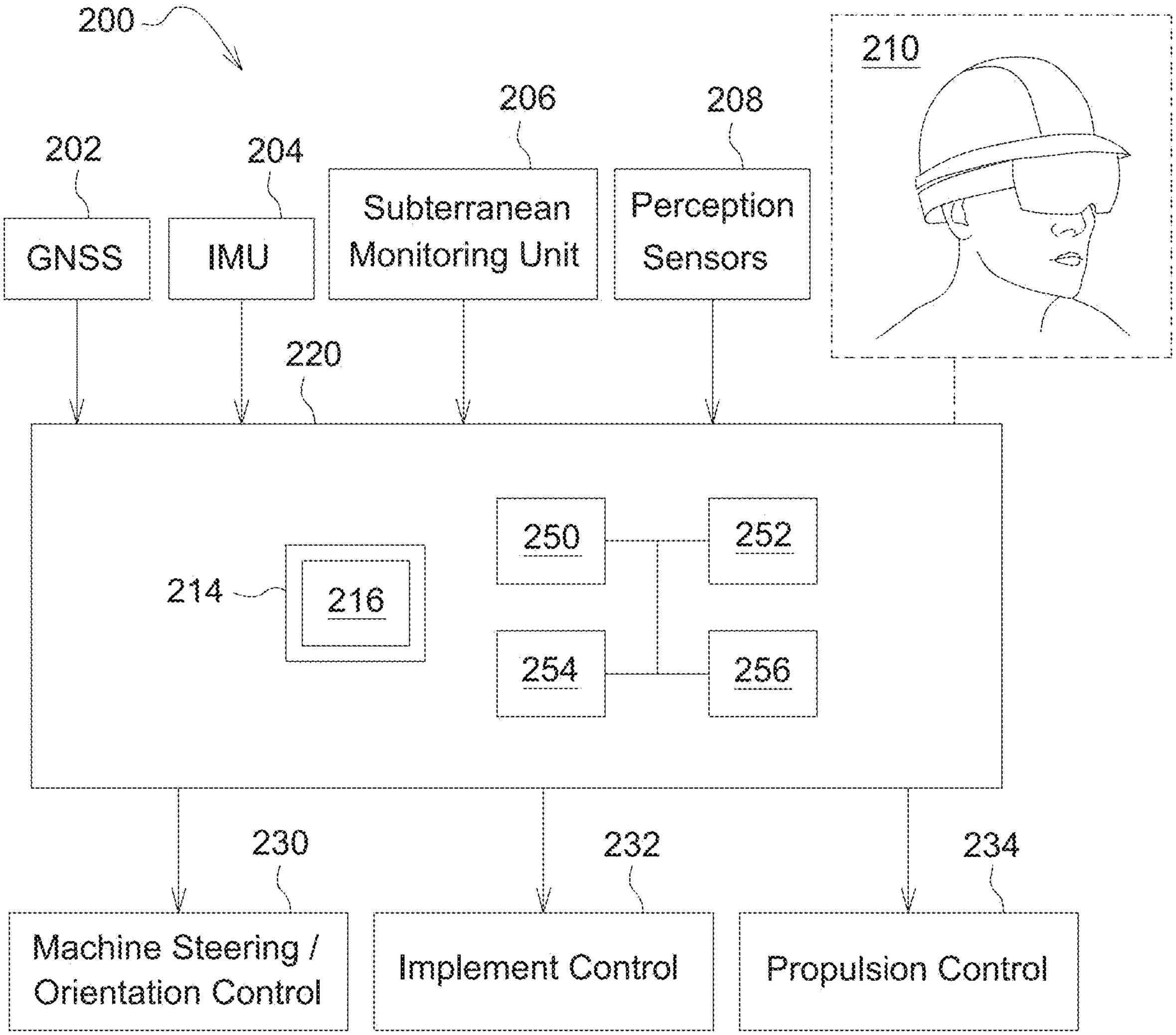
FIG. 2 is a block diagram representing an exemplary control system according to an embodiment of the present disclosure.
Figure 3:
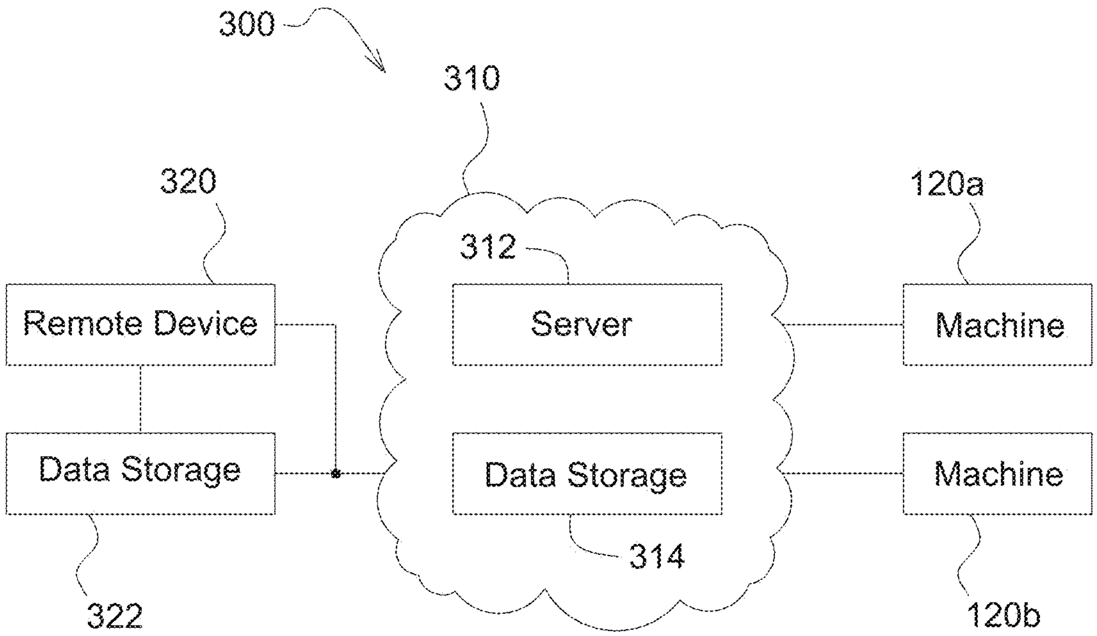
FIG. 3 is a block diagram representing a system for coordinating or otherwise communicating with a plurality of work machines associated with a work area.

As schematically illustrated in FIG. 2, the work machine 20 may include a control system 200 including a controller 220. The controller 220 may be part of the machine control system of the working machine, or it may be a separate control module. The controller is optionally mounted in the operator's cab 192 at the control station 194. The machine controller can include a user interface 214 such as a control panel. The user interface can include a user interface tool such as an input/output device (e.g., a keyboard, a joystick, or the like.) The user interface can also include a display 216. The controller 220 is configured to receive input signals from some or all of sensors 202, 204, 206, 208 as further described below. Various of the sensors 202, 204, 206, 208 may typically be discrete in nature, but signals representative of more than one input parameter may be provided from the same sensor, and a sensor system 202, 204, 206, 208 as disclosed herein may further include or otherwise refer to signals provided from the machine control system.

In an embodiment machine location determining sensors 202 may include a global navigation satellite system (GNSS) transceiver. Machine location determining sensors 202 may additionally or in the alternative include for example ground speed sensors, steering sensors, or the like, or equivalent inputs from the machine control system.

Work implement position sensors 204 in an embodiment as represented in FIG. 1 may include a set of inertial navigation system (INS) sensors mounted on the work machine 120, as represented generally including the multiple sensors **204*a*, 204*b*, 204*c*, 204*d*, 204*e*. Alternative embodiments of work implement position sensors 204** may include rotary pin encoders mounted at pivot pins to detect the relative rotational positions of the respective components, linear encoders mounted on hydraulic cylinders to detect the respective extensions thereof, and the like.

Respective sensors may for example be mounted on opposing sides of at least one linkage joint. An opposing side of the at least one linkage joint may be ascertained by mounting or affixation of the work implement position sensors 204 on either side of the at least one linkage joint, which is defined as a pivotal linkage joint connecting the one or more components of the work implement 140.

The work implement position sensors 204 may be oriented in an x-, y-, and z-axis coordinate system. Using as one example the sensor **204*c* as mounted on the arm 144 and the sensor 204*d* as mounted on the dogbone 160, respective body frames of the work implement position sensors 204*c* and 204*d* (not shown) may be mounted such that the x-axes of the aforementioned body frames point along the direction 176 of the work implement 140. Alternatively, the body frame of the sensor 204***c* and the body frame of the sensor 204*d* may be mounted in a manner such that the z-axes of the aforementioned body frames point in the direction of the main frame 130 of the work machine 120 (i.e., the excavator). Because an x-, y-, and z-axis coordinate system may be defined arbitrarily, the foregoing are not intended as limiting. The x-, y-, and z-axis coordinate system, though it may be defined arbitrarily, relates to the mechanical axes of rotation for roll (i.e., rotation about the x-axis), pitch (i.e., rotation about the y-axis), and yaw (i.e., rotation about the z-axis).

In an embodiment, for each of at least one linkage joint as referenced above, sense elements from the received work implement position sensor output signals may be fused in an independent coordinate frame associated at least in part with the respective linkage joint, the independent coordinate frame of which is independent of a global navigation frame for the work machine 120, wherein for example measurements received by work implement position sensors 204 may be merged to produce a desired output in the work implement 140 of the work machine 120. Accordingly, transformation of the sense elements of received output signals, measured for example by the gyroscopes and the accelerometers in the sensor system 204, may be effectuated using the acceleration measurements and the angular velocity measurements for a joint center of the respective linkage joint, and in an embodiment movement of one or more implement components (e.g., arm, boom, bucket) may be controlled or directed based at least in part on at least one tracked joint characteristic, such as a joint angle, for the respective linkage joint.

As also referenced in FIG. 1, a subterranean monitoring unit 206 may preferably include a GPR unit 206. A GPR unit 206 may for example include energy emitting devices (e.g., a transmitter and antenna) and an energy receiving sensor such as a transducer mounted on a work implement (e.g., bucket) and preferably configured to produce output signals representative of utilities (e.g., pipes, cables, concrete, asphalt, metal, etc.) within the ground. In various embodiments, such signals are produced when at least one surface of the bucket selectively engages the ground surface, but in some embodiments sufficient signal strength may be provided without ground contact. The GPR unit 206 may further include a transmitter, transceiver, and/or the like for communication with, e.g., the controller 220.

One or more perception sensors 208 may also be provided and functionally linked to the controller 220. The perception sensors 208 may include video cameras configured to record an original image stream and transmit corresponding data to the controller 220. In the alternative or in addition, the perception sensors 208 may include one or more of an infrared camera, a stereoscopic camera, a PMD camera, high resolution light detection and ranging (LiDAR) scanners, radar detectors, laser scanners, and the like within the scope of the present disclosure. Corresponding outputs associated with a perception sensor 208 may accordingly relate to images of a perception field (e.g., field of view), point clouds, reflectance/time-of flight data, etc. The number and orientation of perception sensors 208 may vary in accordance with the type of work machine 120 and relevant applications, and a position and size of a perception field encompassed by a respective perception sensor 208 may depend on the arrangement and orientation thereof. For example, the field of view for a video camera may depend on a type of the camera and the camera lens system, in particular the focal length of the lens of the camera. One of skill in the art may further appreciate that, e.g., image data processing functions may be performed discretely at a given perception sensor 208 if properly configured, but also or otherwise may generally include at least some image data processing by the controller 220 or other downstream data processor. For example, perception data from any one or more perception sensors 208 may be provided for three-dimensional point cloud generation, image segmentation, object delineation and classification, and the like, using image data processing tools as are known in the art in combination with the objectives disclosed.

Perception sensors 208 may in various embodiments as disclosed herein be mounted to a portion of the work machine 120 and have a field of view with an orientation corresponding to an orientation of the portion of the work machine to which the perception sensor is mounted, or may be configured for movement in one or more degrees of freedom to have an orientation of a corresponding field of view independent of an orientation of the portion of the work machine to which the perception sensor is mounted.

In other embodiments, one or more position sensors 204 and one or more perception sensors 208 may be mounted on a wearable device 210 which is mounted to, or otherwise configured for movement in association with, a human user. The human user may for example be an operator of the work machine 120 such that a field of view for a perception sensor on the wearable device may define a dynamic field of view from within the operator cab 192. The position sensors may be configured to determine a pose of the wearable device, for example corresponding to movements of the head of the user. Output signals from the position sensors and the perception sensors may be fused and further coordinated with mapped information relating to a work area within the determined field of view to identify subterranean objects of interest to be visually represented.

The controller 220 may be configured to produce outputs, as further described below, to the user interface 214 for display to the human operator or other appropriate user. The controller may be configured to receive inputs from the user interface, such as user input provided via the user interface. Not specifically represented in FIG. 2, the controller of the work machine 120 may in some embodiments further receive inputs from and generate outputs to remote devices associated with a user via a respective user interface, for example a display unit with touchscreen interface. Data transmission between for example a vehicle control system and a remote user interface may take the form of a wireless communications system and associated components as are conventionally known in the art. In certain embodiments, a remote user interface and vehicle control systems for respective work machines may be further coordinated or otherwise interact with a remote server or other computing device for the performance of operations in a system as disclosed herein.

In embodiments wherein a wearable device 210 is provided having one or more perception sensors 208 thereon, the wearable device may further include a display unit 216, for example including or in the form of a user interface 214 functionally linked to the controller 220 and configured to send outputs to the controller and/or receive inputs from the controller 220. The wearable device may for example be a fully enclosed helmet having a display unit integrated within the helmet in a field of view of the user, or may be a headgear with a visor having a display unit integrated in the field of view of the user, etc. The user interface on the wearable device may in some embodiments be configured to display images in a display area corresponding to the field of view and orientation of the wearable device and perception sensors, and further to superimpose over the displayed images augmented reality images and/or other virtual tokens and indicia, such as for example relating to subterranean objects or interest as further described below. In various embodiments, the display area on the wearable device is transparent and effectively corresponds to normal vision by the user with respect to a given orientation and field of view, but may further include superimposed augmented reality images and/or other virtual tokens and indicia, such as for example relating to subterranean objects or interest as further described below.

The controller 220 may further be configured to generate control signals for controlling the operation of respective actuators, or signals for indirect control via intermediate control units, associated with a machine steering control system 230, a machine implement control system 232, and/or a propulsion (e.g., engine speed) control system 234. The control systems 230, 232, 234 may be independent or otherwise integrated together or as part of a machine control unit in various manners as known in the art. The controller 220 may, for example, generate control signals for controlling the operation of various actuators, such as hydraulic motors or hydraulic piston-cylinder units, and electronic control signals from the controller 220 may actually be received by electro-hydraulic control valves associated with the actuators such that the electro-hydraulic control valves will control the flow of hydraulic fluid to and from the respective hydraulic actuators to control the actuation thereof in response to the control signal from the controller 220. In an embodiment, the controller 220 may in the context of a control operation further receive a pivot angle signal from a pivot angle sensor as described above and selectively drive a swing motor automatically to rotate the main frame 130 about the pivot axis 134 relative to the undercarriage 122 to a target pivot position of the main frame relative to the undercarriage, as part of an aforementioned control unit 230, 232, 234 or optionally as a separate and/or integrated control unit within the scope of the present disclosure.

The controller 220 may include, or be associated with, a processor 250, a computer readable medium 252, a communication unit 254, data storage 256 such as for example a database network, and the aforementioned user interface 214 or control panel having a display unit 216. An input/output device, such as a keyboard, touch screen, or other user interface tool may be coupled to the controller 220 via the user interface 214 so that the human operator may input instructions to the controller 220. In certain embodiments wherein a display unit is integrated within a wearable device 210, the user interface 214 may be configured to determine user inputs and corresponding instructions based on movements of the user, for example engagement by the user with generated virtual display elements in the field of view.

It is understood that the controller 220 described herein may be a single controller having all of the described functionality, or it may include multiple controllers wherein the described functionality is distributed among the multiple controllers. For example, a controller or other processing unit may be provided within a wearable device 210, and configured to perform one or more functions as described herein while functionally linked to one or more further controllers or other processing units.

Various “computer-implemented” operations, steps or algorithms as described in connection with the controller 220 or alternative but equivalent computing devices or systems can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term “processor” 250 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a digital signal processor (DSP) and a microprocessor, a plurality of microprocessors, one or more microprocessors in conjunction with a DSP core, or any other such configuration.

The communication unit 254 can support or provide communications between the machine controller 210 and external systems or devices, and/or support or provide communication interface with respect to internal components of the self-propelled work machine 120. The communications unit 254 can include wireless communication system components (e.g., via cellular modem, Wi-Fi® systems, Bluetooth® systems, or the like) and/or may include one or more wired communications terminals such as universal serial bus ports.

The data storage 256 as further described below may, unless otherwise stated, generally encompass hardware such as volatile or non-volatile storage devices, drives, memory, or other storage media, as well as one or more databases residing thereon.

As noted above, various operations as disclosed herein, for example relating to subterranean monitoring operations, utility marking operations, earth working operations, and the like, may be executed via a controller 220 for a given work machine 120, wherein the controller may be a discrete device or integrated with a vehicle control system or equivalent. As further represented in FIG. 3, in various embodiments as disclosed herein operations may further or in the alternative be executed via a distributed system 300 including one or more remote processors, such as servers 312 in a cloud platform 310 or other computing devices 320 such as for example hosted servers or mobile user devices, independently or in association with a local controller 220 for each of one or more work machines 120*a*, 120*b*. Each remote processor 312, 320 may be respectively or collectively associated with cloud data storage 314 or distributed data storage 322 having for example electronic worksite maps, worksite planning information, work machine information, and the like retrievably stored thereon and collectively accessible for execution of the operations as disclosed herein.

Figure 4:
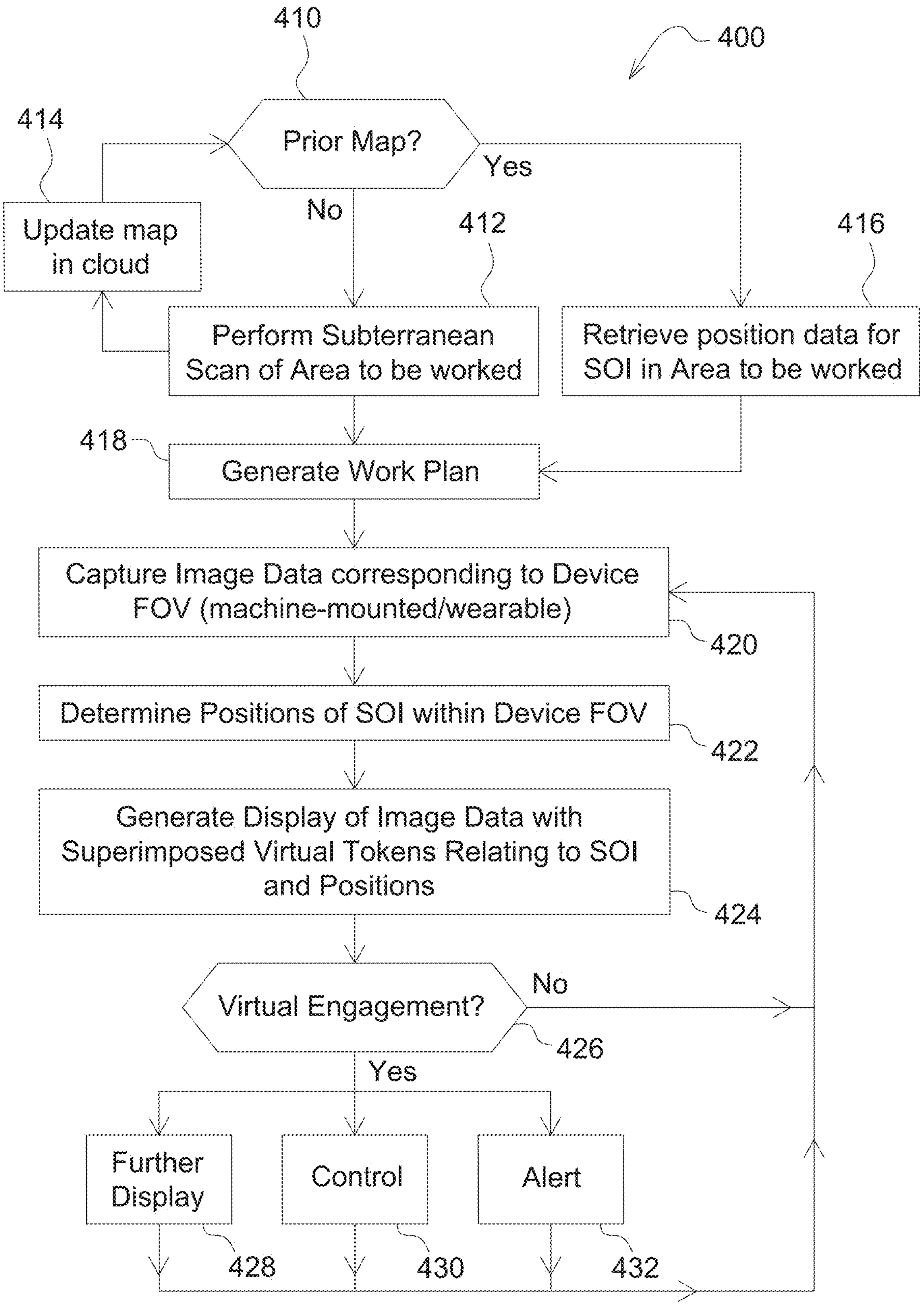
FIG. 4 is a flowchart representing an exemplary embodiment of a method as disclosed herein.

In FIG. 4, the depicted flowchart represents an exemplary embodiment of a method 400 for visually representing subterranean objects of interest to an operator or other user of a work machine. While the illustrated embodiment may include a specific arrangement of steps, inputs, outputs, and the like, it may be understood that certain steps may be combined, performed in a different order, or even omitted altogether in other embodiments within the scope of the present disclosure, unless otherwise specifically noted herein.

In embodiments as described below the work machines are excavators, with at least a first excavator having a subterranean monitoring unit (e.g., including GPR, EML, and/or equivalent sensing technologies) mounted on or integrated into its earth working implement (bucket), but alternative work machines, implements, and configurations, are within the scope of alternative embodiments. One of skill in the art may appreciate that a method as disclosed herein may be performed in various stages, and by different work machines and even types of work machines, unless otherwise expressly noted. For example, a subterranean monitoring operation may be performed by a first work machine, wherein a second work machine having earth working capabilities may subsequently perform such activities, at least in part based on detected object data provided during the subterranean monitoring operation of the first work machine (and potentially other work machines as well).

In addition, steps and functions described herein for mapping data to a worksite map, storing and retrieving detected object data, etc., may be performed by a controller associated with a work machine, collectively performed by multiple controllers associated with respective work machines, performed by one or more remote processors such as arranged in a cloud computing environment, collectively performed by one or more work machine controllers and one or more remote processors, etc.

Accordingly, for operations where a map including subterranean objects of interest for an area to be worked is not yet available (i.e., "no" in response to the query of step 410), at least a first work machine according to the method 400 may be configured to perform at least a subterranean monitoring operation (step 412), for example a utility surveying operation independent of an earth working operation of the bucket and which includes detecting the presence of subterranean objects through the use of a sensor mounted on a work implement, for example a ground-penetrating radar sensor or electromagnetic location device mounted on a work implement which is kept close to or in contact with the surface of the ground during traverse of the work area.

The method 400 may further include determining relevant characteristics of the detected subterranean objects of interest. Any identification of an underground utility, optionally along with characteristics and other relevant indicia associated for example with the type of object, may be further correlated to a geospatial location for the subterranean monitoring unit at the moment of capture. These points could then be built into a data structure logging or otherwise representing the utility positions about the worksite or at least the relevant portions thereof. In various embodiments, the data structure may preferably be uploaded (step 414) and subsequently accessible by each of various work machines, operators, users, or the like assigned to or otherwise associated with the respective work area.

For example, upon completing a scan of an area (or a portion thereof), the work machine performing the utility surveying operation may generate an electronic worksite map, or in the context where an existing worksite map was initially retrieved may update the electronic worksite map based at least in part on the current subterranean monitoring operation. For example, multidimensional parameters may be generated for the electronic worksite map, with two coordinates (x, y) being associated with a current location of the work machine (e.g., a location of the bucket) as determined based on input signals from one or more position sensors, and in some embodiments with information for a third coordinate (z) as corresponding to the x, y location being based at least in part on input signals from the subterranean monitoring unit.

In an embodiment, one or more position characteristics of the bucket including the subterranean monitoring unit may be obtained in part by fusing input signals from the position sensor (e.g., IMU) associated with the bucket with position signals from the position sensor (e.g., IMU) associated with the main frame in a coordinate system independent of a global navigation frame for the map, further wherein the multidimensional parameters are generated at least in part by converting the one or more position characteristics of the bucket into coordinates associated with the global navigation frame.

Embodiments of a system and method as disclosed herein may accordingly pair a bucket including position sensors and a subterranean monitoring unit as disclosed herein with tool tip projections and position sensors on the work machine to preserve and upload a stored log of scanned locations and subterranean objects, conditions, and the like. The same location, for example identified as latitude and longitude (x, y coordinates) in a global coordinate frame can then be referenced by the work machine having performed the subterranean monitoring operation, or another work machine for performing later earth working operations, and further correlated with the subterranean objects, conditions, and the like. In some embodiments, a detected depth coordinate (z) may be associated with the subterranean objects, conditions, and the like. This may for example enable work machines that are not themselves equipped with subterranean monitoring units to nonetheless utilize the information obtained by the first work machine (having performed the subterranean monitoring operation), further enabling the respective work machine operators to observe detected subterranean conditions using a generated display as further described below.

If a map is available, on the other hand (i.e., "yes" in response to the query of step 410), the method 400 may in step 416 include retrieval of the existing electronic worksite map including subterranean objects of interest (e.g., utilities). Retrieval of the existing worksite map may be performed upon initiation of a subterranean monitoring operation, as a trigger for initiating the subterranean monitoring operation, or in some cases not at all wherein for example an electronic worksite map is to be generated as part of the subterranean monitoring operation.

In some embodiments, an existing map is available for a portion of an area to be worked, wherein the existing map and the subterranean objects of interest identified in association therewith are retrieved, while a further subterranean monitoring operation is performed with respect to other portions of the area to be worked.

In some embodiments, an existing map is available for some or all of an area to be worked, wherein the existing map and the subterranean objects of interest identified in association therewith are retrieved, while a subterranean monitoring operation is nonetheless performed to confirm the subterranean objects of interest or details thereof.

Once subterranean objects of interest for an area to be worked have been identified, whether through retrieval of data from an existing map or mapping of such data based on a current subterranean monitoring operation, a work plan may in various embodiments be generated (step 418), which may for example be generated for a particular work operation, not only to arrive at a target profile for the area to be worked and potentially to coordinate work flow with any other work machines in the same area, but further to avoid subterranean objects of interest, etc. The work plan may further be generated to avoid collisions or other types of encounters with respect to previously identified objects within the work area, or objects perceived using the perception sensors during an existing surveying operation, wherein for example an initial work plan may be dynamically altered to produce a current work plan based on the perceived surroundings and a determined impact of engagement therewith.

Figure 5:
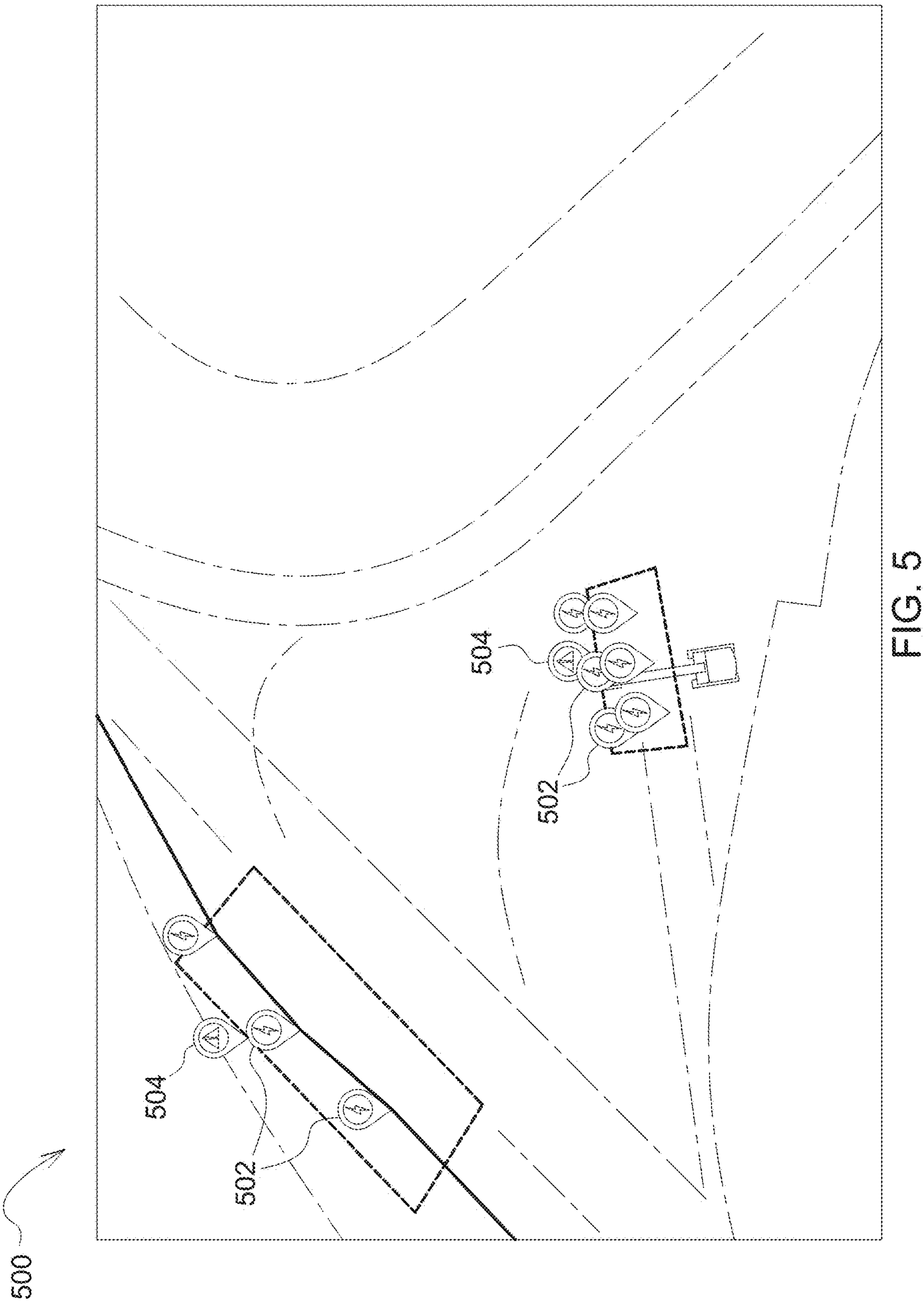
FIG. 5 is an overhead view representing an exemplary worksite map with subterranean object locations according to an embodiment of the method of FIG. 4.

The work plan may be generated for an earth working operation to be performed by the same work machine having performed the subterranean monitoring operation, using the generated or updated electronic worksite map which may for example be stored locally on the work machine or remotely but accessible by an associated controller. In an embodiment, as represented in FIG. 5, the generated or updated electronic worksite map may be selectively displayed during the earth working operation on a display unit accessible to an operator of the work machine. The map may for example include a typical overhead view of the worksite along with notes, indicia, or the like with respect to a detected subterranean object or condition at specified coordinates.

The method 400 continues in step 420 with the capture of image data corresponding to a field of view for an imaging device. As previously noted herein, imaging devices within the scope of the present disclosure may be mounted to the work machine in some embodiments, and in other embodiments may further or alternatively be mounted to a wearable device. The captured image data may further be combined with data from one or more additional data sources to correlate the images with an orientation of the imaging device, such that locations within the field of view may be determined within a coordinate system common to the worksite map including the position data for the subterranean objects of interest.

Also as previously noted herein, such data sources may include IMU's mounted in association with the imaging device, or mounted on the work machine frame if the imaging device is mounted in stationary fashion to the same frame, position sensors such as GNSS transceivers, perception sensors, and the like. In embodiments wherein the imaging device is mounted to a wearable device which is further worn by an operator, a system as disclosed herein is preferably configured, via a processing unit resident on the wearable device and/or processing units residing on the work machine, to dynamically determine locations of each point within a three dimensional field of view as the head of the wearer turns, and to further identify such locations of the subterranean objects of interest 502 in a work area 500 relative to a worksite map which may for example be displayed in a two dimensional format (as represented in FIG. 5). The map may for example include a typical overhead view of the worksite along with notes, indicia, or the like with respect to a detected subterranean object or condition at specified coordinates.

Accordingly, the method 400 may continue in step 422 for a given three dimensional field of view (e.g., dynamically at a single point in time, or after the field of view has been static for a defined period of time) by determining the positions of any one or more subterranean objects of interest within the field of view of the imaging device. In various embodiments, a position for a subterranean object of interest in x- and y-coordinates as stored in the worksite map may preferably be correlated with a location on the ground surface within the field of view at the same x- and y-coordinates.

The method 400 may further continue in step 424 by generating a display comprising virtual tokens 504 relating to the subterranean objects of interest 502, superimposed with respect to the respectively determined positions within the field of view. In an embodiment as further represented in FIG. 6, wherein a displayed work area 500 includes a ground surface to be worked by an earth working tool, the generated display includes virtual tokens 504 superimposed at the ground surface level and corresponding to the (x, y) locations of the respective subterranean objects of interest 502.

Figure 6:
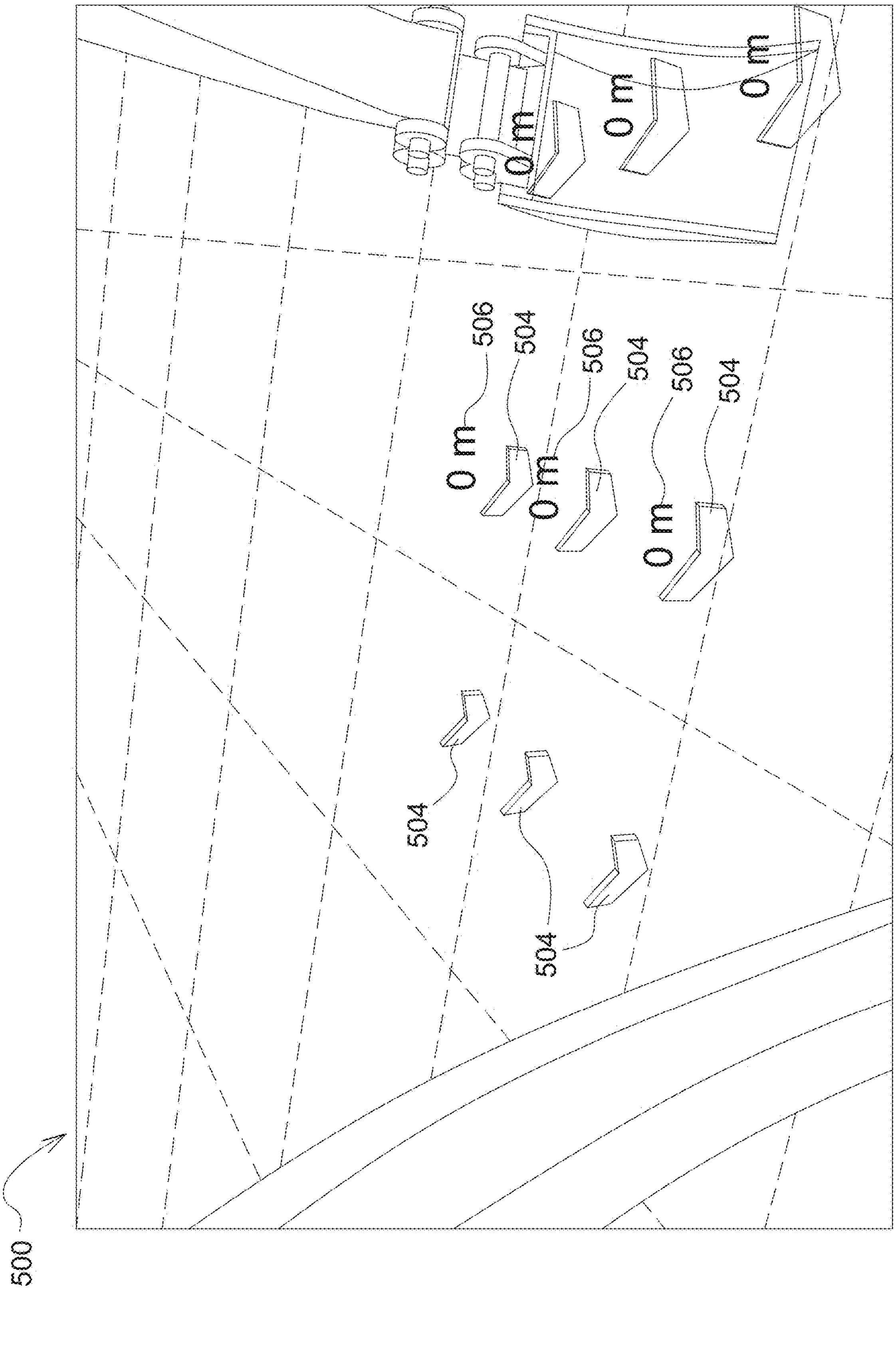
FIG. 6 is a perspective view representing an exemplary image of a worksite having superimposed virtual tokens according to an embodiment of the method of FIG. 4.

The representative display in FIG. 6 further includes indicia 506 for each of the virtual tokens 504, which may for example indicate a depth (z) of the corresponding subterranean object of interest 502, a type thereof, a priority thereof, etc.

It may be understood that the forms or the virtual tokens and/or indicia are not limited to those represented in the figures or otherwise described herein, but may take any number of forms to convey the desired information to the viewer of the display at a given time.

In addition, while individual virtual tokens may be generated at respective locations, for example corresponding to measurements taken during a subterranean monitoring procedure, virtual tokens may be elongated in form or otherwise visually represent utilities such as conduit, wire, or the like as determined from the measurements.

While virtual tokens are represented at the ground surface level, in various embodiments the virtual tokens may be visually represented at an appropriate depth with respect to the ground surface level. In an embodiment, the user may be allowed to select a display format for the virtual tokens, wherein the tokens may be generated at the ground surface position corresponding to the subterranean object of interest or may be generated at an actual depth based on user input.

The display in some embodiments may be generated on a display unit mounted on the work machine or otherwise integrated in a mobile device such as a phone or tablet device, wherein the virtual tokens are superimposed with respect to displayed images corresponding to the captured image data. For example, the display may take the form of a first image layer on an operator display unit which appears as conventional images captured by imaging devices (e.g., cameras) having fields of view extending from a point on the work machine and into the work area. A second image layer may be generated to be superimposed with respect to the first image layer, such that the first image layer is still readily visible to the operator but tokens, notes, indicia, or other parameters corresponding to detected subterranean objects of interest, conditions, or the like are also displayed. As the image layers in this context are perspective views of the work area rather than overhead (e.g., bird's eye) views, three-dimensional coordinates from the generated or updated worksite map corresponding to detected subterranean objects, conditions, or the like require conversion as noted above to determine appropriate locations within the perspective view for appropriately displaying the notes, indicia, or other parameters or otherwise representing a current distance between (for example) the bucket or main frame of the work vehicle and any subterranean objects of interest.

The display in other embodiments may be generated on a display unit integrated into a wearable device 210, wherein the virtual tokens are superimposed within the field of view at locations corresponding to the respective locations of the subterranean objects of interest, if a viewing area associated with the wearable device is transparent.

Alternatively, if the viewing area is not transparent, such as for example where the wearable device is substantially enclosed about the viewing area, the display may be generated on a field comprising the display unit within the wearable device, wherein the virtual tokens are superimposed with respect to displayed images corresponding to the captured image data.

In addition to the display function, the method 400 may in some embodiments include automatic control of one or more actuators in association with the earth working operation and based on at least one determined subterranean condition, such as for example to maintain a minimum distance between the bucket and any (or specific examples of) subterranean objects.

Further in addition to the display function, the method 400 may in some embodiments include alert functions based on at least one determined subterranean condition, such as for example to provide audible or visual notifications when a detected or predicted distance between the bucket and any (or specific examples of) subterranean objects is at or below a defined threshold.

In various embodiments, the superimposed elements in an augmented, virtual, or otherwise enhanced display as disclosed herein may not be limited to virtual tokens and indicia corresponding to subterranean objects of interest, but may further include tags, alerts, highlighting, and the like to indicate other objects of interest above the ground surface, such as for example a target path corresponding to the determined work plan, predicted safety risks, virtual boundaries for the work area, portions of the work area that are already graded to a target profile, detected or calculated operating characteristics of one or more machine components, etc.

In some embodiments, the method 400 may include monitoring for user input (i.e., "yes" in response to the query in step 426) with respect to virtual engagement of or with one or more virtual tokens or other elements within the display. Such user input may be provided through user manipulation of tool functionally linked to the display such as a mouse for moving a cursor and selecting associated elements, or by monitoring movements of a hand or other element extended into the field of view.

As one example, the method 400 may include in step 428 the generation of further display elements within the field of view corresponding to the user input, such as for example defining a path with respect to the work area, defining boundaries, highlighting a selected virtual token within the field of view, and the like. In an embodiment, menu items may be available within the display area, wherein selection of a menu item may select indicia to be displayed, define subterranean objects of interest to be displayed, define priorities for the various subterranean objects of interest, or the like.

As another example, the method 400 may include in step 430 control functions which are executed responsive to user input. In an embodiment, the user input may enable automatic control of one or more earth working functions generally by selection of a menu item generated within the display area, or more particularly with respect to one or more selected features within the display area, such as for example based on a path defined via motions associated with the user input.

As another example, the method 400 may include in step 432 alert functions which are executed responsive to user input.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of visually representing subterranean objects of interest during operations by a work machine comprising a work implement having a ground engaging tool on a first end thereof, wherein the work implement is coupled at a second end to a frame of the work machine and configured to move independently of the frame, the method comprising:

determining electronically mapped position data of one or more subterranean objects of interest in an area to be worked, wherein the mapped position data comprise at least latitudinal and longitudinal dimensions for each respective subterranean object of interest in a global coordinate system;

capturing image data corresponding to a field of view directed from a point associated with the work machine;

determining respective positions for any of the one or more subterranean objects of interest within the field of view, relative to the point associated with the work machine; and automatically rendering a display corresponding to the captured image data, further visually populated to include virtual tokens for each of the any subterranean objects of interest within the field of view and corresponding to the respective position data thereof.

2. The computer-implemented method of claim 1, wherein the steps of determining respective positions for any of the one or more subterranean objects of interest within the field of view, relative to the point associated with the work machine, comprises fusing the mapped position data and position data corresponding to an image data source pose into a common reference coordinate system.

3. The computer-implemented method of claim 2, wherein the image data source is a camera mounted on the work machine, and moveable in orientation to define the image data source pose and the field of view.

4. The computer-implemented method of claim 2, wherein the image data source is a camera mounted on a wearable unit, the wearable unit comprising the display and an inertial sensor unit configured to generate output signals representing the image data source pose based on movements of a wearer thereof.

5. The computer-implemented method of claim 1, wherein the virtual tokens are visually rendered to correspond with ground surface locations within the field of view having the latitudinal and longitudinal dimensions for each respective subterranean object of interest, and each virtual token is further associated with visually rendered indicia representing a mapped depth of the respective subterranean object of interest.

6. The computer-implemented method of claim 1, comprising automatically controlling movement of the ground engaging tool with respect to a target grade profile, further accounting for and avoiding engagement with the one or more subterranean objects of interest in the area to be worked.

7. The computer-implemented method of claim 1, comprising automatically rendering the display further visually populated to include a virtual path for the ground engaging tool and accounting for and avoiding engagement with the one or more subterranean objects of interest in the area to be worked.

8. The computer-implemented method of claim 1, comprising:

detecting at least one of the one or more subterranean objects of interest via output signals from a subterranean monitoring sensor associated with the work implement; and automatically mapping one or more parameters associated with the at least one of the one or more subterranean objects to respective locations in an electronic worksite map.

9. The computer-implemented method of claim 8, wherein the electronic worksite map comprises previously mapped position data for the at least one of the one or more subterranean objects of interest, the method further comprising verifying a work plan for the work machine generated based on the previously mapped position data, by comparison with the detected at least one of the one or more subterranean objects of interest.

10. The computer-implemented method of claim 8, wherein the electronic worksite map comprises previously mapped position data within a portion of the area to be worked, the method comprising generating a prompt to traverse a remaining portion of the area to be worked and to detect and map any further subterranean objects of interest.

11. The computer-implemented method of claim 1, comprising:

detecting at least one of the one or more subterranean objects of interest via output signals from a subterranean monitoring sensor associated with a work implement of a first work machine;

automatically mapping one or more parameters associated with the at least one of the one or more subterranean objects to respective locations in an electronic worksite map;

wherein upon updating the electronic worksite map by automatically mapping the one or more parameters associated with the at least first type of detected object to respective locations therein the electronic worksite map, the updated electronic worksite map is uploaded to a remote data storage by the first work machine, and retrievable by a second work machine performing an earth working operation in association with the area to be worked.

12. A system for visually representing subterranean objects of interest during operations by a work machine comprising a work implement having a ground engaging tool on a first end thereof, wherein the work implement is coupled at a second end to a frame of the work machine and configured to move independently of the frame, the system comprising:

data storage comprising electronically mapped position data of one or more subterranean objects of interest in an area to be worked, wherein the mapped position data comprise at least latitudinal and longitudinal dimensions for each respective subterranean object of interest in a global coordinate system;

an image data source configured to capture image data corresponding to a field of view directed from a point associated with the work machine; and one or more processors functionally linked to the data storage and to the image data source and configured to:

determine respective positions for any of the one or more subterranean objects of interest within the field of view, relative to the point associated with the work machine; and automatically render a display corresponding to the captured image data, further visually populated to include virtual tokens for each of the any subterranean objects of interest within the field of view and corresponding to the respective position data thereof.

13. The system of claim 12, wherein the one or more processors are configured to determine respective positions for any of the one or more subterranean objects of interest within the field of view, relative to the point associated with the work machine, at least in part by fusing the mapped position data and position data corresponding to an image data source pose into a common reference coordinate system.

14. The system of claim 13, wherein the image data source is a camera mounted on the work machine, and moveable in orientation to define the image data source pose and the field of view.

15. The system of claim 13, wherein the image data source is a camera mounted on a wearable unit, the wearable unit comprising the display and an inertial sensor unit configured to generate output signals representing the image data source pose based on movements of a wearer thereof.

16. The system of claim 12, wherein the virtual tokens are visually rendered to correspond with ground surface locations within the field of view having the latitudinal and longitudinal dimensions for each respective subterranean object of interest, and each virtual token is further associated with visually rendered indicia representing a mapped depth of the respective subterranean object of interest.

17. The system of claim 12, wherein the one or more processors are configured to generate control signals for automatically controlling movement of the ground engaging tool with respect to a target grade profile, further accounting for and avoiding engagement with the one or more subterranean objects of interest in the area to be worked.

18. The system of claim 12, wherein the one or more processors are configured to:

detect at least one of the one or more subterranean objects of interest via output signals from a subterranean monitoring sensor associated with the work implement; and automatically map one or more parameters associated with the at least one of the one or more subterranean objects to respective locations in an electronic worksite map.

19. The system of claim 18, wherein the electronic worksite map comprises previously mapped position data for the at least one of the one or more subterranean objects of interest, the one or more processors further configured to verify a work plan for the work machine generated based on the previously mapped position data, by comparison with the detected at least one of the one or more subterranean objects of interest.

20. The system of claim 12, wherein:

at least one of the one or more processors is associated with a first work machine, and configured to:

detect at least one of the one or more subterranean objects of interest via output signals from a subterranean monitoring sensor associated with a work implement of the first work machine;

automatically map one or more parameters associated with the at least one of the one or more subterranean objects to respective locations in an electronic worksite map; and wherein upon updating the electronic worksite map by automatically mapping the one or more parameters associated with the at least first type of detected object to respective locations therein the electronic worksite map, the updated electronic worksite map is uploaded to the data storage;

wherein at least a further one of the one or more processors is associated with a second work machine and configured to retrieve the updated electronic worksite map for performing an earth working operation in association with the area to be worked.

* * * * *